March 21, 1944. H. P. MASSEY 2,344,515
MEANS AND METHOD FOR INCREASING THE MAGNUS EFFECT
Filed Jan. 17, 1941
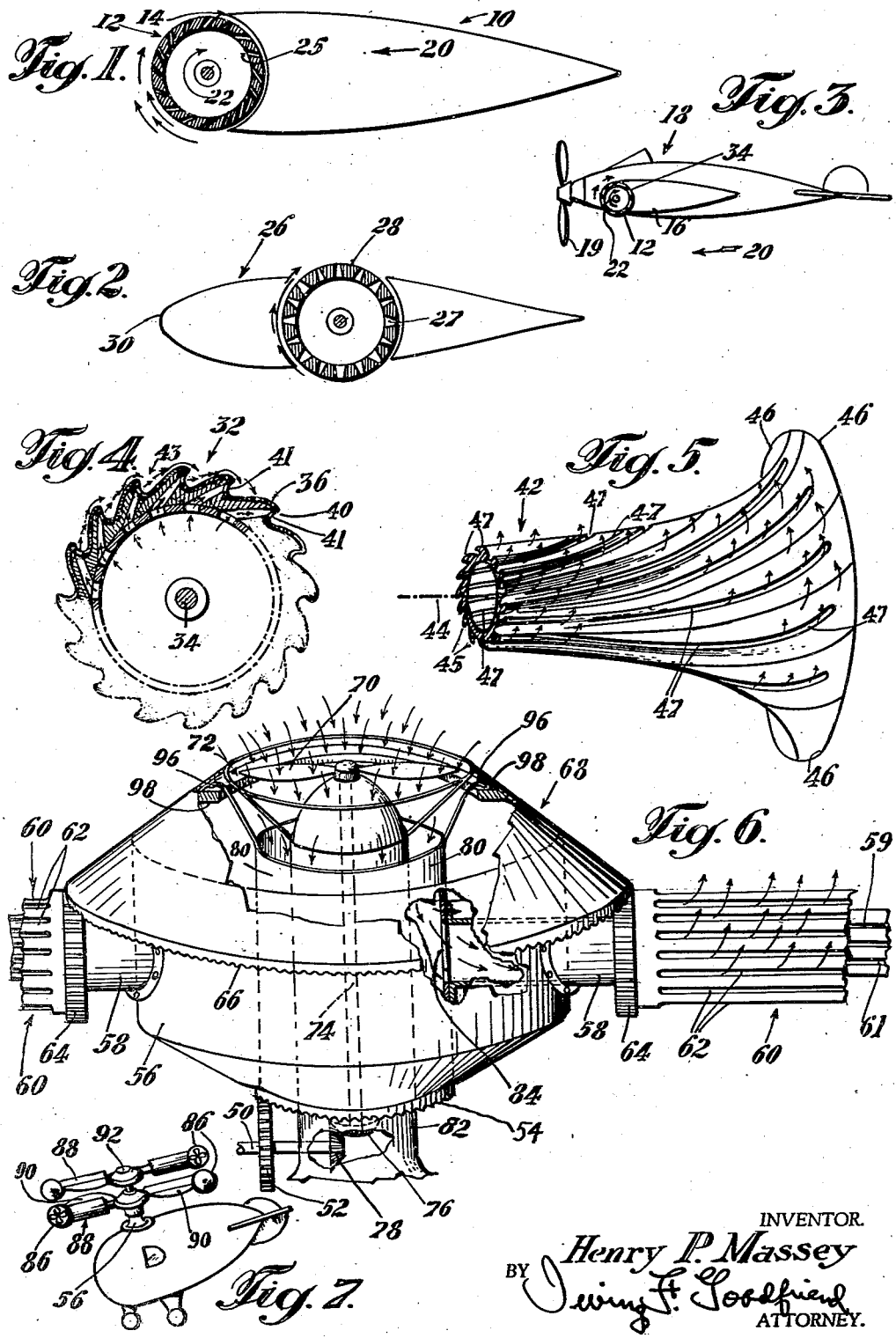

Patented Mar. 21, 1944

2,344,515

UNITED STATES PATENT OFFICE 2,344,515

MEANS AND METHOD FOR INCREASING THE MAGNUS EFFECT

Henry P. Massey, New York, N. Y.

Application January 17, 1941, Serial No. 374,876

20 Claims. (Cl. 244—10)

The present invention relates generally to bodies that are reacted upon by a fluid medium to thereby cause a moving or lifting effect thereon.

The present invention relates broadly to a method and the provision of means for increasing the Magnus effect.

The present invention also relates specifically to the application to aircraft of the aforesaid means and method for increasing the Magnus effect to create a greater lifting effect on such aircraft with or without a forward movement of the aircraft relative to the earth.

Heretofore the Magnus effect has been utilized to cause propulsion of seacraft, for example in the "Flettner rotor ship," and to cause a lifting effect in aircraft, as described in my prior Pats. Nos. 1,698,819, 1,714,608, 1,714,609, and 1,820,919.

The present invention contemplates the provision of means and a method for increasing the Magnus effect upon a rotating body to thereby cause an augmented motion or lift thereof.

Other and further objects and advantages of the present invention will be apparent from the following description and the drawing relating thereto, in which Fig. 1 is a transverse sectional view of an embodiment of my present invention illustrating an airfoil and a rotating body arranged at the leading edge of the airfoil.

Fig. 2 is a transverse sectional view of another embodiment of the present invention illustrating the rotating body arranged intermediate the leading edge and the trailing edge of the airfoil.

Fig. 3 is a side elevational view of an airplane with the airfoil and rotating body arranged as in Fig. 1.

Fig. 4 is a fragmentary sectional view of a modification of a rotating body used in the practice of the present invention.

Fig. 5 is a perspective view of another modification of a rotating body used in the practice of the present invention.

Fig. 6 is a side elevation partly in section, partly broken away, illustrating an application of my invention to a helicopter form of aircraft.

Fig. 7 is a perspective diagrammatic view of a modification of a helicopter form of aircraft to which my invention is applied.

When an air current strikes a rotating cylinder the Magnus effect is caused. The effect is due to the increased velocity of the air current where the skin convection current is substantially in the same direction of said air current and to the decreased velocity of the air current where the skin convection current is opposed to the air current. According to Bernoulli's theorem, where the velocity of the air current is greatest the pressure is least, and where the velocity of the air current is least the pressure is greatest. Therefore, a lifting or moving effect on the rotating body arranged in an air stream is produced toward the lesser pressure area.

This effect has been utilized to produce movement, as in the Flettner rotor ship or to cause a lifting effect in the aircraft illustrated and described in my hereinabove-mentioned patents.

To increase this Magnus effect, I direct a stream of air into the cylinder and discharge the air from the cylinder, at the surface reacted upon to produce the Magnus effect, to thereby greatly augment it. It will be apparent that the effect of the skin convection currents is increased and greater skin convection currents are produced.

In Fig. 1 is illustrated an application of the present invention to aircraft. A preferable hollow rotating cylinder 12 extending horizontally is arranged at the leading edge 14 of an airfoil 10. While I use the term "cylinder" it will be understood that this term covers any body which is symmetrical about its axis of rotation and has a substantial surface for the reaction of a fluid medium thereon in accordance with the Magnus effect.

It will be understood, of course, that the airfoil 10 may itself be the wing 16 of an aircraft 18, such as illustrated in Fig. 3.

Many mechanisms for causing rotation of the cylinder 12 will occur to persons skilled in the art and need not therefore be shown. One such means is described in connection with Fig. 6 and in several of my hereinbefore-mentioned patents.

It will be, of course, understood that the rotating cylinder will be journaled on the fuselage of an aircraft or other body, also by any well known means, and that it will rotate in the proper direction to produce the desired lift or movement.

It will be understood that where it is desired to produce lift, the cylinder is to be arranged for rotation about a horizontal axis, and where it is desired to produce movement as in a ship, the cylinder will usually be arranged for rotation about a vertical axis.

With the airplane 18 in operation in the air and moving in the direction of the arrow 20 and with the cylinder 12 being rotated clockwise in the direction of the arrow 22 it will be seen that the wind striking the cylinder will cause, because of the skin convection between the cylinder and the air, an increase in velocity of the air over the top of the rotating cylinder and a decrease in the velocity of the air passing underneath the cylinder since the cylinder is rotated in a direction to increase the velocity of the air passing over the top of the cylinder, and to decrease the velocity of the air passing underneath the cylinder by reason of the friction and inverse direction of the air currents.

This results in a reduction of pressure over the top of the cylinder while therebeneath an increase of pressure is produced. This is in accordance with Bernoulli's theorem which states that where the velocity is greatest the pressure is least and correspondingly where the velocity is least the pressure is greatest. Each such cylinder is rotated to cause an upward force or lifting effect. Similarly an upward force or supporting effect is exerted on the lower surface of each such airfoil by reason of the decreased air velocity and increased air pressure caused by the rotating cylinder arranged at the leading edge thereof.

The resultant pressure on the surface of the airfoil is in part dependent upon the direction and velocity of the stream-lined flow warped around the rotating surfaces which in turn is a function of their angular velocity and the transversal speed of the wind passing around them. The accelerated wind velocity passing over the upper surface of the rotating cylinder and then transmitted to the airfoil serves to increase the negative pressure of a portion of the upper surfaces of the airfoil whence the lifting power of the airfoil is further increased.

As stated hereinbefore the reaction of the air flow on the lower surfaces of the rotating cylinder and the airfoil is to increase the negative pressure on the portion of the upper surface of the airfoil whereby the lifting effect thereon is further augmented.

As stated before the reaction of the air flow on the lower surface of the rotating cylinder and its effect on the airfoil tends to increase the positive pressure or upward forces exerted thereon. The net result, therefore, of each rotating body in combination with its airfoil is a marked increase of the ratio of lift to drag commonly known as the L/D ratio. It is to be understood, of course, that discs (not shown) may be provided on the outer edge of the rotating cylinder to prevent the air current from spreading and so tend to concentrate the pressure variations in order to get the maximum benefit therefrom.

In order to increase the lifting effect upon airfoil 10 and the cylinder 12 I prefer to provide means for discharging air from said cylinder about said cylinder, so to increase the Magnus effect. Any suitable fan, etc., might be provided to circulate air into the cylinder 12. Various means and their arrangement for accomplishing this will occur to those versed in the art and will not therefore be here described. One such means is the fan illustrated in Fig. 6, though it will be understood that the fuselage of aircraft 18 may be so arranged that air from the propeller 19 will be directed into the cylinder 12. The air within the cylinder 12 may be discharged therefrom by providing suitable openings or preferably slots 24 in the surface of the cylinder extending substantially from one end to the other end thereof. These slots 24 are preferably formed so that the air is discharged toward the direction of rotation of said cylinder tangentially thereof to form a blanket of moving air thereabout.

It will, of course, be understood that the openings or slots 24 may be constructed to assume any desired form, such as a nozzle or spout, and to direct the air outwardly from the cylinder toward the direction of rotation thereof (as the slots 25, Fig. 1), although it is believed that air discharged from the cylinder in any direction, such as radially (as the slots 27, Fig. 2), may increase the Magnus effect.

It is immediately apparent that the discharge of the air from the cylinder 12 not only will increase the velocity of air over the cylinder 12 but also over the airfoil 10 and lessen the velocity of air underneath the cylinder and the airfoil. As a result there will be an increased negative pressure developed above the cylinder and airfoil and an increased positive pressure below them, thereby resulting in an increased lifting effect.

Another embodiment of the principle of the present invention applicable to aircraft is shown in Fig. 2. Here the airfoil 26 has arranged intermediate the leading edge and the rear edge thereof a rotating cylinder 28. In this embodiment the air underneath the airfoil reaches the surface of the rotating cylinder 28 where its velocity is retarded due to the discharge of air from the rotating cylinder as well as the skin convection air current caused by the rotation of said cylinder. Conversely the velocity of the air above the airfoil upon reaching the rotating cylinder is increased. Thus, an increased Magnus effect is caused resulting in greater lift of the airfoil and its rotating cylinder 28.

While I have heretofore described the rotating bodies 12 and 28 as being cylinders, they do not necessarily have to be cylindrical in outline as long as they are symmetrical in shape about their axes of rotation and have some surface for reaction thereon in accordance with the Magnus effect. In Fig. 4 I have illustrated another form of rotating body embodying the present invention. The rotating body 32 is preferably hollow and may be provided with a corrugated sheet metal surface symmetrically arranged around the axis of rotation 34, the ridges 36 of which are preferably equidistant from each other. The ridges 36 are formed at their outer tips 40 with openings, through which the nozzles 41 communicate with the interior of the body so that the air circulated through the interior of the rotating body 32 is discharged through the openings substantially tangentially of the surface of the rotating body to thereby form a blanket or wrap of moving air thereabout.

It will be seen that in the illustration, the rotating body 32 rotates in a clock-wise direction and the nozzle openings 40 on the ridges 36 point substantially in the direction of rotation.

The number of nozzles 41, their relative spacing and the depth of the ridges 36, may be varied and will depend on the diameter and size of the rotating body, its speed of rotation and the like, it being desired to obtain such a blanket of moving air about the rotating cylinder that in the conditions of use, the augmenting of the moving or lifting effect will be greatest.

The angle at which the nozzles 41 are arranged within the ridges 36 is preferably such that the air discharged therefrom will just strike the cambered surface 43 of the next ridge (as shown by the arrows, Fig. 4) so that it will be deflected slightly upward over the ridge.

The air discharged from each nozzle produces a vacuum at its mouth which pulls the air deflected at the cambered surface of the ridge in which the nozzle is arranged toward the body, thereby assisting in the formation of a body enshrouding blanket of air moving in the direction of rotation of the body.

Heretofore, in order to prevent the air on the rotating body from spreading and thereby losing its effectiveness it has been customary to provide sheltering discs at the end of the rotating body. Since, however, such sheltering discs tend to create a maximum of pressure adjacent the sheltering discs without evenly offering effective resistance to the spread of the air throughout the body there has resulted a certain amount of lateral movement of the air on the rotating body.

To prevent this air movement and to provide uniform resistance thereto throughout the body I have provided a further novel shape for the rotating body, illustrated in Fig. 5. The rotating body 42 illustrated in that figure rotates about a central axis 44 and may have the exterior thereof corrugated to form the ridges 45 which are formed at their outer tips 47 with openings in the shape of nozzles or spouts so that the air is discharged at the surface of the body tangentially thereof to form an enshrouding blanket of air thereabout, such as with the body illustrated in Fig. 4.

As viewed in Fig. 5 the rotating body 42 is flared toward the outer end thereof and terminates in a rim 46 having the end thereof slightly bent inwardly toward the air inlet of the rotating body 42. The nozzle openings 47 are preferably in the form of slots, extending from the air inlet end to the flared outer end. The openings 47 are preferably substantially helically arranged on the surface of the rotating body 42.

My invention is particularly adaptable to a helicopter form of aircraft, as illustrated in Fig. 6.

It will be understood that by helicopter I mean any structure in which an upward lift is obtained by the revolution of operative elements thereof about a vertical axis. In the present invention the rotating bodies are substituted for the conventional helicopter blades.

The lifting effect of a rotating body in an air current may be applied to substantially vertically raise an aircraft as illustrated in Pat. No. 1,698,819 granted to me. In this application, only a portion of a helicopter sufficient for an understanding of the application of the present invention thereto is illustrated.

An operating shaft 50, connected to any suitable source of motive power, such as an internal combustion engine, has a gear 52 secured thereon for rotation therewith, the teeth of said gear meshing with teeth 54 arranged on a rotatable turret 56. The turret 56 has arranged thereon a plurality of sleeves 58 which are carried on the turret to revolve around its central vertical axis.

A slotted cylindrical body 60 is journaled at the end of each sleeve 58 for rotation thereon about its horizontal axis, the sleeve continuing into a slotted portion 59, extending through the interior of the rotating body to communicate therewith through the slots 61. The rotating body 60 may be formed in any of the shapes hereinbefore described such as the body 42 (Fig. 5) or the body 32 (Fig. 4), the cylinder 12 (Fig. 1). The body 60 has arranged on the reaction surface thereof the slots 62 formed therein for the discharge of air therefrom.

In order to effect operative rotation of the body 60, I arrange on the inner journaled end of each body the gear 64. The teeth of the gear 64 mesh with suitable cooperating teeth 66 arranged on the bottom of the cone-like skirt 68, fixed relative to the rotating turret 56.

Upon rotation of the turret about its vertical axis through the gears 50 and 54 the horizontally disposed bodies 60 are carried by the turret to revolve about its vertical axis and concurrently the teeth 66 on the skirt 68 drive the gear 64 causing each body 60 to rotate about its horizontal axis.

The sleeve 58 is continued into the slotted portion 59 to strengthen its support of the rotating body 60, which is operatively reacted upon and which is journaled at its inner end on the sleeve 58 and at its outer end (not shown) on the slotted portion 59.

As I have previously pointed out, a Magnus lifting effect is caused to raise the aircraft on which the turret and rotating bodies are arranged.

In order to increase the Magnus effect I provide means for circulating air through a sleeve 58 through the slots 61 to each body 60 to be discharged therefrom through the openings or slots 62 at the body reaction surface, such as the fan or propeller 70 arranged at the top of the skirt 68 within the opening 72. The fan 70 is arranged for rotation by providing a central shaft 74 connected thereto at one end thereof and terminating at the other end thereof in a gear 76 which meshes with another gear 78 arranged on the operating shaft 50. It will be seen that the rotation of shaft 50 not only rotates the turret 56 but also the fan or propeller 70.

The fan 70 draws air from the outside and circulates it intermediate a cylindrical wall 80 which is secured to and rotates with the turret and a cylindrical fixed housing 82 in which the shaft 74 is arranged. Sleeves 58 which have the rotating bodies 60 journaled thereon for rotation are connected to the cylindrical wall 80 through suitable openings 84 provided therein to permit circulation of air into the body 60.

The upper end 96 of the cylinder 80 is journaled on the ledge 98 fixed to the skirt 68. It will be understood that any form of suitable bearing such as ball bearings may be used, though they are not illustrated since exact details thereof will occur to any skilled mechanic.

It will be recognized that I have provided a novel helicopter form of aircraft, and particularly one upon the rotating bodies of which an increased lifting effect is caused by the suitable discharge of air therefrom at the reacting surface thereof.

Another form of helicopter embodying my invention in which a fan 86 is arranged at each outer end of the body 88 rotating about a horizontal axis and which body is arranged in advance of, and adjacent the leading edge of an airfoil 90 with which it is combined to form the helicopter elements.

The body 88 and airfoil 90 extend outwardly from, and are carried by rotatable turrets 92. The fans 86 are operatively connected to a source of motor power in the fuselage of the aircraft and are positioned at the outer ends of the helicopter blades so that they will circulate air through the rotating bodies 88 which have openings on their reaction surfaces for the discharge of air therefrom and therethrough. The reaction of the air upon the fans will provide a turning moment about the vertical axis of the turret, thereby concurrently causing, with the operation of the fan, revolution of its supporting helicopter element and the turret about the turret axis.

It will be understood that the fans at each end of a helicopter element are arranged to supplement each other's reaction force and not oppose it.

Where a plurality of sets of horizontally extending rotating bodies is provided, one set above the next, as shown in Fig. 7, it will be understood that the fans are so arranged that one set revolves about a vertical axis in one direction and the next set revolves about the vertical axis in the opposite direction (as is more particularly pointed out in Pat. No. 1,698,819 granted to me), and each of the bodies rotates about its horizontal axis to provide the desired lifting effect.

It will be understood that the outer end of each rotating body is closed, so that the air will be directed outwardly through the openings or slots to be discharged therethrough and therefrom.

It will, in addition, be understood that concurrent rotation of the bodies 88 will be effected by means similar to that described with reference to the device of Fig. 6.

It will, of course, be understood that in order to obtain forward movement of the aircraft, the helicopter assembly is arranged to be suitably tilted. This arrangement is not illustrated since it is known in the art and forms no part of my present invention.

It will also now be further apparent that in my present invention, the air is brought to the rotating body to produce motion of the fluid medium in which the body is moving; that is with the present invention, I bring the air to the machine rather than, as heretofore, bring the machine to the air.

While I have described in specific detail certain embodiments of the present invention I do not intend to be limited thereto but intend to claim the invention as broadly as the following claims and the state of the prior art permit.

I claim:

1. In a helicopter, the combination with an airfoil of a horizontally disposed hollow body arranged at the leading edge of the airfoil, said body having a surface to be reacted upon and rotating about a horizontal axis, said airfoil and body being arranged for revolution about a vertical axis, the surface of said body to be reacted upon having openings therein for the discharge of air therefrom, a rotating fan arranged at the end of the body opposite said vertical axis for concurrently causing revolution of said body and airfoil about the vertical axis and circulating air into said body for the discharge thereof from the openings in said reacting surface.

2. An aircraft having as a means for producing a lifting effect thereon, a hollow body revolving about a vertical axis and concurrently rotating about a horizontal axis, said body being of a generally symmetrical configuration about the horizontal axis, the surface of said body arranged about the horizontal axis being of relatively substantial area and having openings therein for the discharge of air therefrom substantially radially of the horizontal axis of rotation and means for supplying air under pressure to the hollow body for discharge thereof through said openings at the surface of the body.

3. A helicopter assembly having a plurality of horizontally extending bodies, said bodies revolving about a vertical axis and said bodies concurrently rotating about horizontal axes, each of said bodies being of a generally symmetrical configuration about its horizontal axis and having a surface thereabout of relatively substantial area, each of said bodies having openings therein at said surface for the discharge of air therefrom substantially radially of the horizontal axis of rotation and means for supplying air under pressure to the hollow bodies for discharge therefrom through said openings on each body.

4. In a helicopter assembly, a turret rotating about its vertical axis, a horizontally-extending hollow body carried by said turret, said body rotating about its horizontal axis, a fan arranged in communication with the turret for circulating air through said body, the surface of said body having openings therein for the discharge of air therefrom substantially radially of the horizontal axis of rotation and means for supplying air under pressure to the hollow body for discharge thereof through the said openings.

5. In a helicopter assembly, a turret rotating about its vertical axis, a stationary sleeve secured to the turret, a body rotatably arranged on the sleeve, said body extending from the turret radially thereof and rotating about its horizontal axis and means on the turret engaging and cooperating with means on the rotating body for effecting rotation of the body about its horizontal axis upon rotation of the turret about its vertical axis.

6. The device of claim 5 including a fan arranged in communication with the turret for circulating air through the stationary sleeve and said body, the peripheral surface of said body about the horizontal axis having openings therein for the discharge of the air therefrom, said turret communicating with the said body through the stationary sleeve thereby providing a path for circulation of a stream of air generated by the fan for its discharge from the openings.

7. In a helicopter assembly, a rotating turret, a housing, a rotating shaft extending through the housing, and a fan secured to one end of the shaft, a cylinder in the turret, surrounding said housing and spaced therefrom to form therewith an air conduit, a stationary sleeve arranged on the turret and secured to said cylinder, a body rotatably arranged on the sleeve, and in communication with said conduit through the sleeve, whereby air is circulated by the fan through the cylinder and the sleeve into said body, means on the turret engaging and cooperating with means on the body to cause rotation of said body about its horizontal axis upon rotation of the turret about its vertical axis, said body having openings arranged on the surface thereof for discharge of the air therethrough.

8. In an aircraft the combination with an airfoil of a horizontally disposed body extending transversely from the aircraft and rotating about its horizontal axis, said body extending adjacent to, and along, the leading edge of the airfoil, said body having openings arranged at its peripheral surface about said horizontal axis of rotation for discharging air therefrom, said body so constructed and arranged with respect to the airfoil that said airfoil is acted upon by the air discharged from the openings and means for discharging air from the interior of the body through said openings.

9. In an aircraft the combination with an airfoil of a horizontally disposed body extending transversely from the aircraft and rotating about its horizontal axis, said body arranged intermediate the leading and trailing edges of the airfoil, said body having openings arranged at its peripheral surface about said horizontal axis of rotation for discharging air therefrom, said body so constructed and arranged with respect to the airfoil that said airfoil is acted upon by the air discharged from the openings and means for discharging air from the interior through said openings.

10. In an aircraft the combination with an airfoil of a horizontally extending body rotating about its horizontal axis, said body being symmetrical about said axis of rotation, said body having openings arranged at its peripheral surface about said horizontal axis of rotation for the discharge of air therefrom, said body so aligned with respect to the airfoil that said airfoil is acted upon by the air discharged through said openings and means for discharging air from the interior through said openings.

11. In an aircraft, the combination with an airfoil of a horizontally extending body rotating about its horizontal axis, said body being symmetrical about said axis of rotation, said body having openings arranged at its peripheral surface about said horizontal axis of rotation for the discharge of air therefrom, said body so aligned with respect to the airfoil that said airfoil is acted upon by the air discharged through said openings, said body having a relatively substantial reacting surface and means for discharging air from the interior of the body through the said openings.

12. A body for reaction in accordance with the Magnus effect and adapted for circulation of air in the interior thereof by means with which the said body is operatively associated, said body being symmetrical about its axis of rotation, the surface of said body which is reacted upon in accordance with the Magnus effect flaring outwardly along the horizontal axis, said surface having openings therein for the discharge of the said air therefrom at said surface.

13. A body for reaction in accordance with the Magnus effect and adapted for circulation of air in the interior thereof by means with which the said body is operatively associated, said body being symmetrical about its axis of rotation, the surface of said body which is reacted upon in accordance with the Magnus effect flaring outwardly along the horizontal axis, said surface having openings therein for the discharge of the said air therefrom at said surface, said openings extending axially along the surface of the body from substantially adjacent one end of the body to substantially the other end.

14. A body for reaction in accordance with the Magnus effect, said body being symmetrical about its axis of rotation, the surface of said body which is reacted upon flaring outwardly along the horizontal axis, said surface having openings therein for the discharge of air therefrom, said openings extending axially along the surface of the body from substantially adjacent one end of the body to substantially the other end, said openings being curved helically along the said surface.

15. A body for reaction in accordance with the Magnus effect, said body being symmetrical about its axis of rotation, the peripheral surface of said body which is reacted upon in accordance with the Magnus effect being corrugated, said surface formed with openings therein along the ridges or the grooves of the corrugations for the discharge of air therefrom at said surface.

16. A body for reaction in accordance with the Magnus effect, said body being symmetrical about its axis of rotation, the surface of said body which is reacted upon being corrugated to form ridges and grooves, said ridges having openings therein, the ridges being in cross-section in the shape of a nozzle to discharge the air tangentially along the surface towards the direction of rotation.

17. A body for reaction in accordance with the Magnus effect and adapted for circulation of air in the interior thereof by means with which the said body is operatively associated, said body being symmetrical about its axis of rotation, the surface of said body which is reacted upon in accordance with the Magnus effect being of substantial area, said surface having openings therein constructed and arranged for the discharge of the said air therefrom at said surface substantially tangentially of the said surface.

18. A body arranged for rotation about its axis in a relatively moving fluid to thereby cause reaction thereon by the relative movement of said fluid, said body adapted for the circulation of fluid therethrough by means with which the body is associated and said body being symmetrical about its axis of rotation, the surface of said body which is reacted upon being of substantial area, said surface having openings therein for the discharge at the said surface of the said circulated fluid therefrom at the said surface.

19. A substantially cylindrical body for rotation about its horizontal axis in a relatively moving fluid to thereby cause reaction thereon by the fluid, said body adapted for the circulation therethrough of fluid by means with which the body is associated the surface of said body reacted upon by the relative moving fluid having openings therein for the discharge at the said surface therefrom of the fluid circulated therethrough at the said surface.

20. The method of increasing the Magnus effect on a body which comprises the steps of circulating fluid through the interior of the body and then discharging the fluid from the interior of the body at the peripheral surface reacted upon in accordance with the Magnus effect.

HENRY P. MASSEY.